United States Patent [19]
Hirsch

[11] Patent Number: 5,847,901
[45] Date of Patent: Dec. 8, 1998

[54] APPARATUS FOR REMOVING A PLATE HOLDER FROM AND/OR RETURNING IT TO AN EXCHANGEABLE MAGAZINE

[75] Inventor: Alexander Hirsch, Stuttgart, Germany

[73] Assignee: Eastman Kodak Company, Rochester, N.Y.

[21] Appl. No.: 866,990

[22] Filed: Jun. 2, 1997

[30]      Foreign Application Priority Data

Jun. 10, 1996 [DE] Germany ................. 196 23 124.8

[51] Int. Cl.⁶ .................................................. G11B 17/04
[52] U.S. Cl. ...................................... 360/99.07; 369/77.2
[58] Field of Search ............................ 360/99.06, 99.07, 360/98.06, 99.02, 99.03; 369/77.1, 77.02, 75.2

[56]           References Cited

U.S. PATENT DOCUMENTS

| | | | |
|---|---|---|---|
| 4,561,085 | 12/1985 | Funabashi | 369/77.1 |
| 4,817,071 | 3/1989 | Carlson et al. | 360/99.06 X |
| 5,572,497 | 11/1996 | Kim et al. | 369/77.2 |
| 5,615,197 | 3/1997 | Choi | 369/77.2 |
| 5,621,708 | 4/1997 | Fujita et al. | 360/98.06 X |

FOREIGN PATENT DOCUMENTS

| | | |
|---|---|---|
| 0205074 | 5/1991 | European Pat. Off. . |
| 0284815 | 11/1993 | European Pat. Off. . |

*Primary Examiner*—John H. Wolff
*Attorney, Agent, or Firm*—Raymond L. Owens

[57]           ABSTRACT

An apparatus for removing a plate holder from and/or returning it to an exchangeable magazine with at least one plate holder in which plate-shaped objects are deposited one in each. One side of the plate holders provided with a rack engaged by a feed gear actuable by a gearing in two directions of rotation alternately. The feed gear has a tooth-free, raised zone arranged thereon in such a way as to engage with a corresponding tooth-free zone on the rack of the plate holder at the beginning of the withdrawing movement. The feed gear is peripherally provided with a projection which is offset towards the raised zone and pushes the plate holder into a defined final position in the magazine. In this position, the feed gear and the rack of the plate holder are in a disengaged condition. The projection of the feed gear has a right-angled, radially projecting face co-operating with the front face of the plate holder.

13 Claims, 5 Drawing Sheets

APPARATUS FOR REMOVING A PLATE HOLDER FROM AND/OR RETURNING IT TO AN EXCHANGEABLE MAGAZINE

FIELD OF THE INVENTION

The invention relates to an apparatus for removing a plate holder from and for returning it to an exchangeable magazine.

BACKGROUND OF THE INVENTION

A playback system for a disc cartridge is disclosed in EP-A-0 205 074, wherein the information carrier (disk shaped object) is completely surrounded by the disc cartridge. The disc cartridge has on one side a rack engaged by a loading gear to place the disc cartridge together with the information carrier therein into a predetermined position inside the disc cartridge. The loading gear has a projection which, when the disc cartridge is in an inserted condition, engages with a recess in the disc cartridge in order to thus define an exact initial position for the disc cartridge, which the user has to insert manually. The initial meshing between the rack and the loading gear is thus synchronizable. This apparatus is not suited for defined, automatic deposit of the disc cartridges.

Patent Specification EP-B-0 284 815 shows a disc player provided in a lifting chassis. Opposite the lifting chassis is a receptacle in which several trays or disc holders with plate-shaped information carriers are provided. One side of each disc holder is provided with a rack engaging with a feed gear of the lifting chassis so as to draw a selected disc holder from the receptacle. The rack has a projection and the feed gear has a tooth-free zone engaging with the projection. To remove a particular disc holder, the lifting chassis is raised in such a way that the selected disc holder can be removed from the receptacle. During the lifting motion, the feed gear is in engagement with the rack of the disc holder. As a result of the above-mentioned engagement, exchange of the receptacle for a different one is not possible at all times, because the lifting mechanism always has to be in a position in which the feed gear is disengaged from the projection.

SUMMARY OF THE INVENTION

The object underlying the invention is to provide an apparatus with which individual plate holders of a magazine can be deposited in the magazine in such a way that the magazine is removable at all times, irrespective of the position of the apparatus for removing a plate holder from and for returning it to the exchangeable magazine.

A further object of the invention is to devise the apparatus in such a way that the plate holders are deposited in a defined initial position or final position in the magazine.

These objects are achieved in an apparatus for removing a plate holder from and being adapted to return it to an exchangeable magazine, comprising:

(a) at least one plate holder in which the plate-shaped objects are deposited, the plate holder being provided on one side with a rack; and (b) a feed gear engageable with the rack and actuable in two directions of rotation alternately, and wherein the feed gear has a tooth-free, raised zone arranged thereon in such a way as to engage with a corresponding tooth-free zone on the rack of the plate holder at the beginning of the withdrawing movement of the plate holder, the feed gear being peripherally provided with a projection which is offset towards the raised zone and pushes the plate holder into the magazine to such an extent that the plate holder assumes a defined final position in the magazine, and that the feed gear and the rack of the plate holder are in a disengaged condition.

In accordance with the invention in that the feed gear is peripherally provided with a projection which is offset towards the raised zone and pushes the plate holder into the magazine to such an extent that the plate holder assumes a defined final position in the magazine, and that the feed gear and the rack of the plate holder are in a disengaged condition.

The apparatus embodying the invention has the advantage that the plate holders of an exchangeable magazine can be deposited in a defined position in the magazine.

It has proved to be especially advantageous that with respect to a deposited plate holder, the feed gear and the rack of the plate holder are in a disengaged condition. Thus the magazine can always be exchanged for a different one. At the same time is it ensured that the feed gear and the rack of the plate holder do not sustain any damage. The feed gear has four different zones, a raised, tooth-free zone, adjacent to a uniformly toothed rim, adjacent to a projection and a tooth-free zone provided between the projection and the raised zone. The rack of the plate holder has an extension extending beyond the edge of the plate holder. Provided on the extension is a raised zone adjacent to a tooth-free zone, followed by equally spaced teeth extending almost throughout the length of the plate holder. For removal of a plate holder from the magazine, the raised zone of the feed gear and the tooth-free zone of the rack of the plate holder co-operate and draw the plate holder from the magazine until the equally spaced teeth of the feed gear and the rack engage. If the feed gear rotates in the other direction, the plate holder is fed back to the magazine. The feed gear rotates until the projection of the feed gear abuts against the flat front face of the extension of the rack of the plate holder and thus pushes the plate holder into a defined final position in the magazine. It is to be noted that in this position the feed gear and the rack of the plate holder are in a disengaged condition.

The subject matter of the invention will be described with reference to preferred embodiments which will be explained in greater detail in the light of the following drawings.

DETAILED DESCRIPTION OF THE PREFERRED EMBODIMENTS

Figure 1:
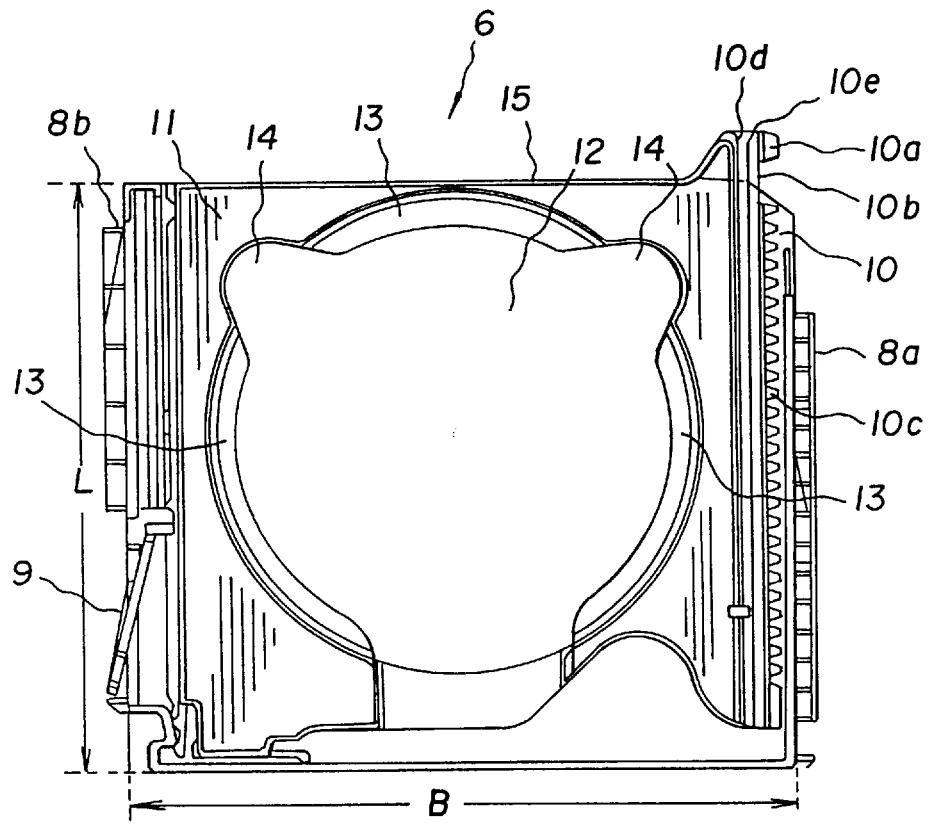
FIG. 1 is a plan view of an embodiment of a plate holder for receiving plate-shaped objects.
Figure 2:
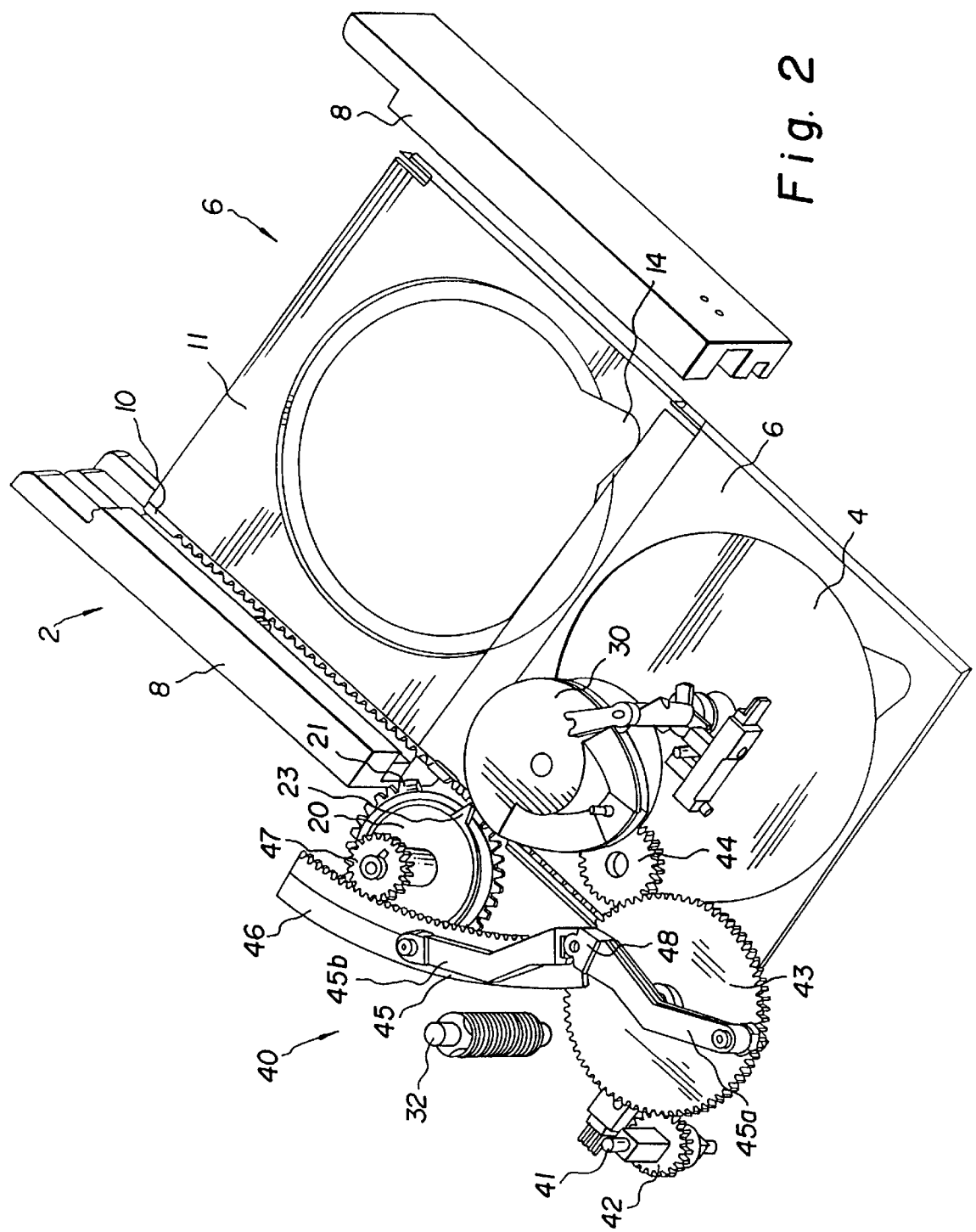
FIG. 2 is a perspective in schematic form of the apparatus for removing plate-shaped objects from and returning them to an exchangeable magazine.

FIG. 1 shows a plate holder 6 for deposit of a plate-shaped object 4, the plate holder 6 being receivable in and removable from a magazine 2 (see FIG. 2). The plate holder 6 is substantially rectangular and has guide rails 8a and 8b, one at each of two opposed sides, for inserting the plate holder 6 in the magazine 2. Further, on one of the guide rails is a locking mechanism 9 securing the plate holder 6 in the magazine 2 in order that it does not drop out when the magazine is exchanged. The locking mechanism 9 is not important for the invention and therefore will not be dealt with in any further detail. For support of a plate-shaped object 4, a substantially flat area 11 is provided between the guide rails 8a and 8b and is furnished with a circular opening 12 (in the representation of FIG. 1), the diameter of which is somewhat larger than the diameter of the plate-shaped object 4. In the embodiment depicted in FIG. 1, the plate holder 6 is suited for receiving a disk shaped object, but it will be apparent to those skilled in the art that plate-shaped objects 4 of any shape are suited for handling by the apparatus embodying the invention. Naturally the opening in the flat area has to be formed according to the shape of the plate-shaped object. The following description will be limited to disk shaped objects only.

For support of the disk shaped object 4, the circular opening 12 is circumferentially formed with a plurality of inwardly projecting side rests 13 upon which the disk shaped object 4 lies. To facilitate removal of the disk shaped object 4 from the disc holder by a user, the circular opening 12 is additionally formed with at least one recess 14 extending beyond the circumference of the circular opening 12.

To deposit the disc holder 6 in or remove it from the magazine 2, one side of the disc holder 6 is formed with a rack 10. The rack 10 is subdivided into three zones. A first zone consists of a tooth or protrusion 10a, adjacent to a tooth-free zone 10b, followed in turn by a zone of linearly arranged, equally spaced teeth 10c. The disc holder is substantially rectangular in shape with length L and breadth B. In the representation of FIG. 1, the first zone is at the top right corner of the disc holder 6 and is adjacent to the tooth-free zone 10b and equally spaced teeth 10c. If the top edge of the disc holder 6 in the representation of FIG. 1 is called the front edge 15 of the disc holder 6, then the protrusion 10a and the tooth-free zone 10b of the rack 10 project beyond the front edge 15 of the disc holder 6. The raised zone 10a and the tooth-free zone 10b of the rack 10 are situated on this extension 10d. Further, the extension 10d has a front face 10e.

The schematic representation of FIG. 2 shows the way in which the various functional groups of the apparatus co-operate. Some components have been omitted for the sake of clarity. As already described above, the individual disc holders 6 are disposed in a magazine 2 from which they can be removed and to which they can be returned. The magazine 2 can be exchanged for a different one if required. Of the magazine 2, only, two lateral guides 15 for the disc holder 6 are shown in FIG. 2. FIG. 2 shows two disc holders 6, one of which is in the inserted position in the magazine 2 and the other has been removed from the magazine 2 and is under the pick-off unit 30 which removes the disk shaped object 4 from and deposits it in the disc holder 6.

To remove a disc holder 6 from and/or return it to an exchangeable magazine 2, a feed gear 20 is provided associated to that side of the disc holder which is furnished with the rack 10. An electric motor (not shown) drives a gearing 40 whose motive force is transmitted to the feed gear 20. The motor is connected to a driving gear 42 by way of a shaft 41. The driving gear 42 transmits the rotary motion to an intermediate gear 43 driving on the one hand a pick-off gear 44 and on the other hand, via a split crank lever 45, a concave rack 46. The rack engages with a transmitting gear 47 connected to the feed gear 20. The crank lever 45 is pivoted proximate to the outer edge of the transmitting gear and approximately midway of the rack 46. The first portion 45a and second portion 45b of the split crank lever 45 are interconnected through a link 48 and biased by means of a leg spring (not shown). In another embodiment, the crank lever 45 (see FIG. 4) can also take the form of a rigid, bent crank lever 45. The rack 46 is conducted in a guide (not shown) to thus constantly ensure engagement between the rack 46 and the transmitting gear 47.

As already mentioned above, the gearing 40 also drives the pick-off gear 44 which in turn actuates the pick-off unit 30 to remove the disk shaped object 4 from or deposit it in the disc holder 6. Pick-off unit 30 and gearing 40 are movable in common perpendicular to the plane of the disc holder 6 to approach different magazines or the individual disc holders 6 of a magazine 2. The direction of motion is determined by a slide bar 32. Associated to the intermediate gear 43 is a sensor 34 which detects the position of the intermediate gear 43 and routes electric signals to a central control unit (not shown). The sensor 34 senses a marking (not shown) provided under the intermediate gear 43.

Figure 3:
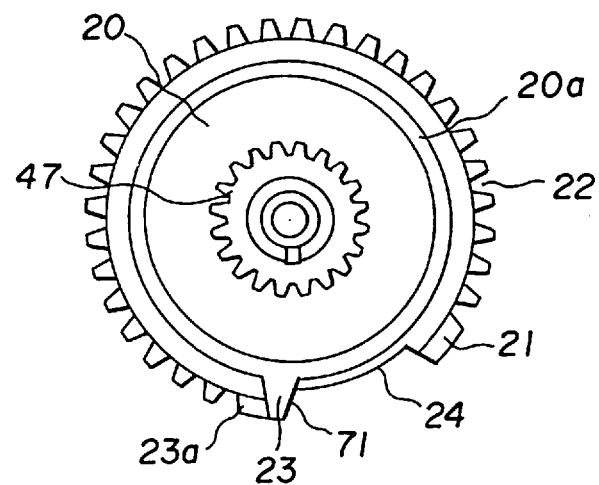
FIG. 3 is a plan view of the feed gear for moving the plate holder from and to the magazine.

The feed gear 20 moves the disc holder 6 from or to the magazine 2. FIG. 3 shows the feed gear 20 in plan view. As already mentioned above, connected to the arbor of the feed gear 20 is a transmitting gear 47 engaged with the rack 46. The outer periphery of the feed gear 20 is subdivided into four zones. The first zone is a tooth-free protrusion 21. The tooth-free protrusion 21 is adjacent to the second zone, a uniformly toothed rim 22 encompassing almost the entire periphery of the feed gear 20. The end of the uniformly toothed rim 22, opposite the tooth-free protrusion 21, is adjacent to a projection 23. Between the tooth-free protrusion 21 and the projection 23 is a tooth-free zone 24. The tooth-free protrusion 21 and the projection 23 are of a width corresponding approximately to the width of two teeth of the uniformly toothed rim 22. The tooth-free zone is about four teeth of the uniformly toothed rim 22 wide. The heights of the tooth-free protrusion 21 and projection 23 equal the height of the teeth of the toothed rim 22. The projection 23 of the feed gear 20 has a right-angled, radially projecting face 71 (see FIGS. 5 and 6) corresponding in its length to the height of the teeth of the uniformly toothed rim 22. Further, the feed gear 20 is formed with an inner ring 20a distinctly higher than the feed gear 20. The width of the projection 23 is equal to the height of the inner ring 20a of the feed gear 20. Further formed on the projection 23 is a supporting element 23a which is longer than a tooth of the uniformly toothed rim 22 and is arranged perpendicular to the radially projecting face 71.

As already mentioned, the disc holder 6 is drawn out of the magazine 2 or inserted in the magazine 2 by means of the rotary motion of the feed gear 20. If the feed gear 20 rotates clockwise (the direction of rotation relates to the representation of FIG. 2), the disc holder 6 is drawn out and, if it rotates counterclockwise, the disc holder 6 is pushed back into the magazine 2. The disc holder 6 is removed from the magazine 2 by the tooth-free protrusion 21 of the feed gear 20 engaging with the tooth-free zone 10b on the rack 10 of the disc holder 6. Thus the locking force of the magazine 2 is overcome by the disc holder 6. In the following, as the feed gear 20 rotates further (in the same direction), its uniformly toothed rim 22 then engages with the equally spaced teeth 10c of the rack 10 of the disc holder 6 and further rotation (in the same direction) of the feed gear 20 conveys the disc holder 6 to a defined position (drawn out position) in which the disk shaped object 4 can be removed from or deposited in the disc holder 6.

For return of the disc holder 6 to the exchangeable magazine 2, the feed gear 2 rotates counterclockwise. First the equally spaced teeth 10c of the rack 10 of the disc holder 6 are in engagement with the uniformly toothed rim 22 of the feed gear 20. Then the tooth-free zone 10b of the rack 10 of the disc holder 6 engages with the tooth-free protrusion 21 of the feed gear 20, pushing the disc holder 6 into the magazine 2 to such an extent that the locking mechanism 9 is engaged. The feed gear 20 rotates further and for a certain time no motion is transmitted from the feed gear 20 to the disc holder, since during that time the tooth-free zone 24 of the feed gear 20 passes by the disc holder 6. The rotary motion of the feed gear 20 is concluded when the projection 23 of the feed gear 20 bears against the front face 10e of the extension 10d of the rack 10 of the disc holder 6. The projection 23 bearing against the front end or front face 10e of the extension 10d of the rack 10 of the disc holder 6 causes the feed gear 20 to finally assume a defined final or initial position.

In the position in which the projection 23 of the feed gear 20 bears against the front face 10e of the extension 10d of the rack 10 of the disc holder 6, the feed gear 20 and the rack 10 of the disc holder 6 are in a disengaged condition. The magazine 2 can be exchanged for a different one, without the gearing 40 and the pick-off unit 30 having to be traversed into an initial position by way of the slide bar 32.

Figure 4:
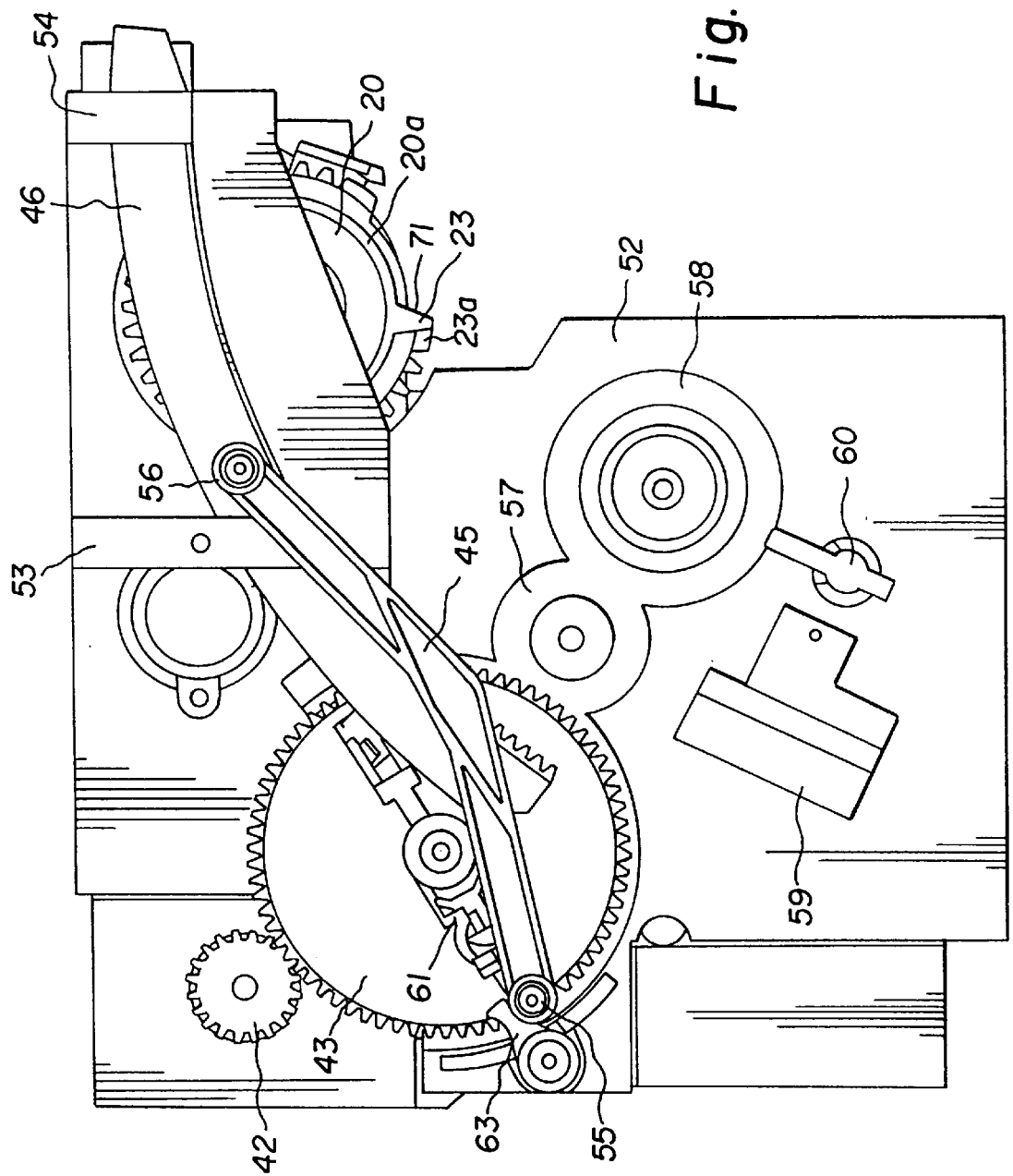
FIG. 4 is a plan view of a further embodiment of the apparatus in accordance with the present invention.
Figure 5:
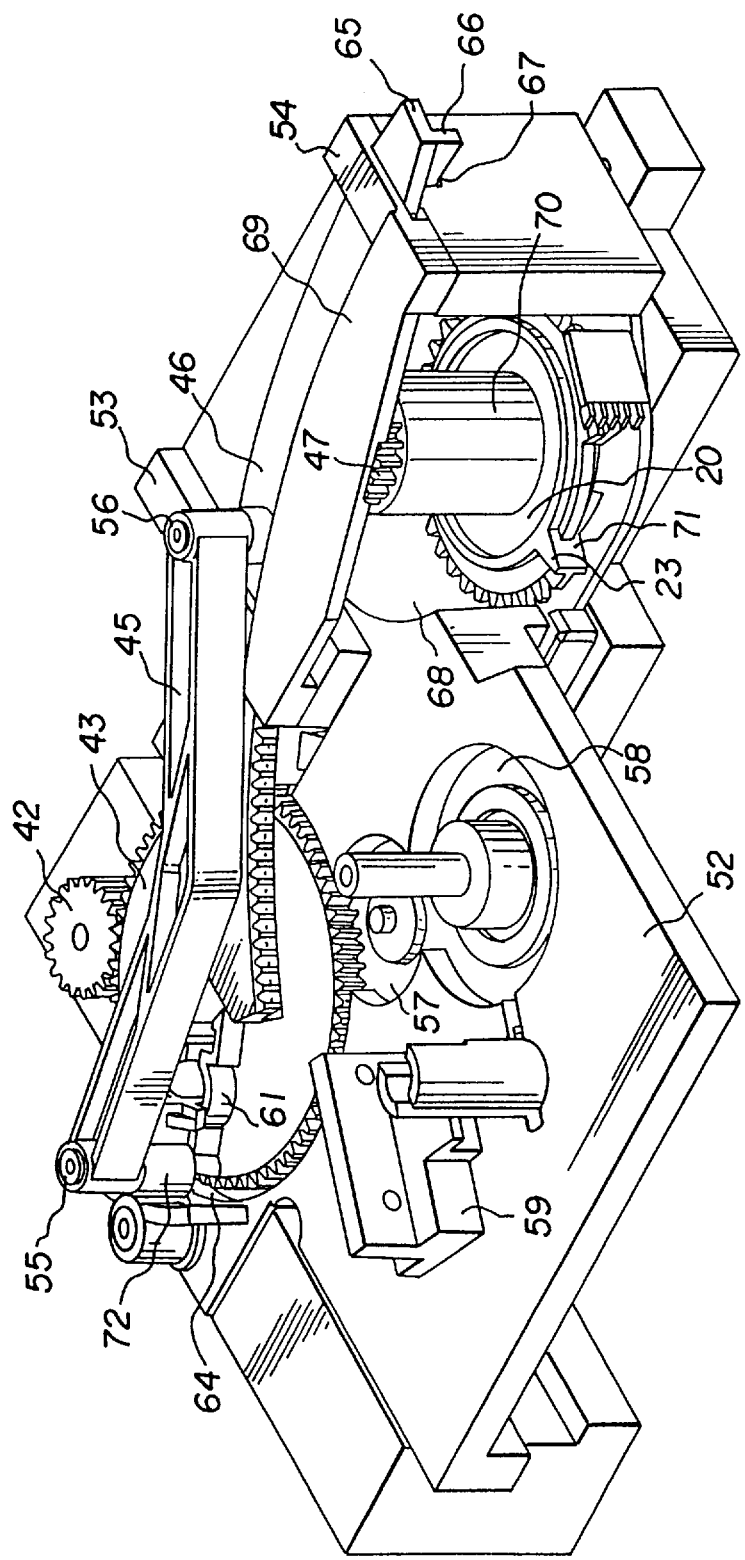
FIG. 5 is a perspective of the apparatus of FIG. 4, some components not important for the invention having been omitted for the sake of clarity.
Figure 6:
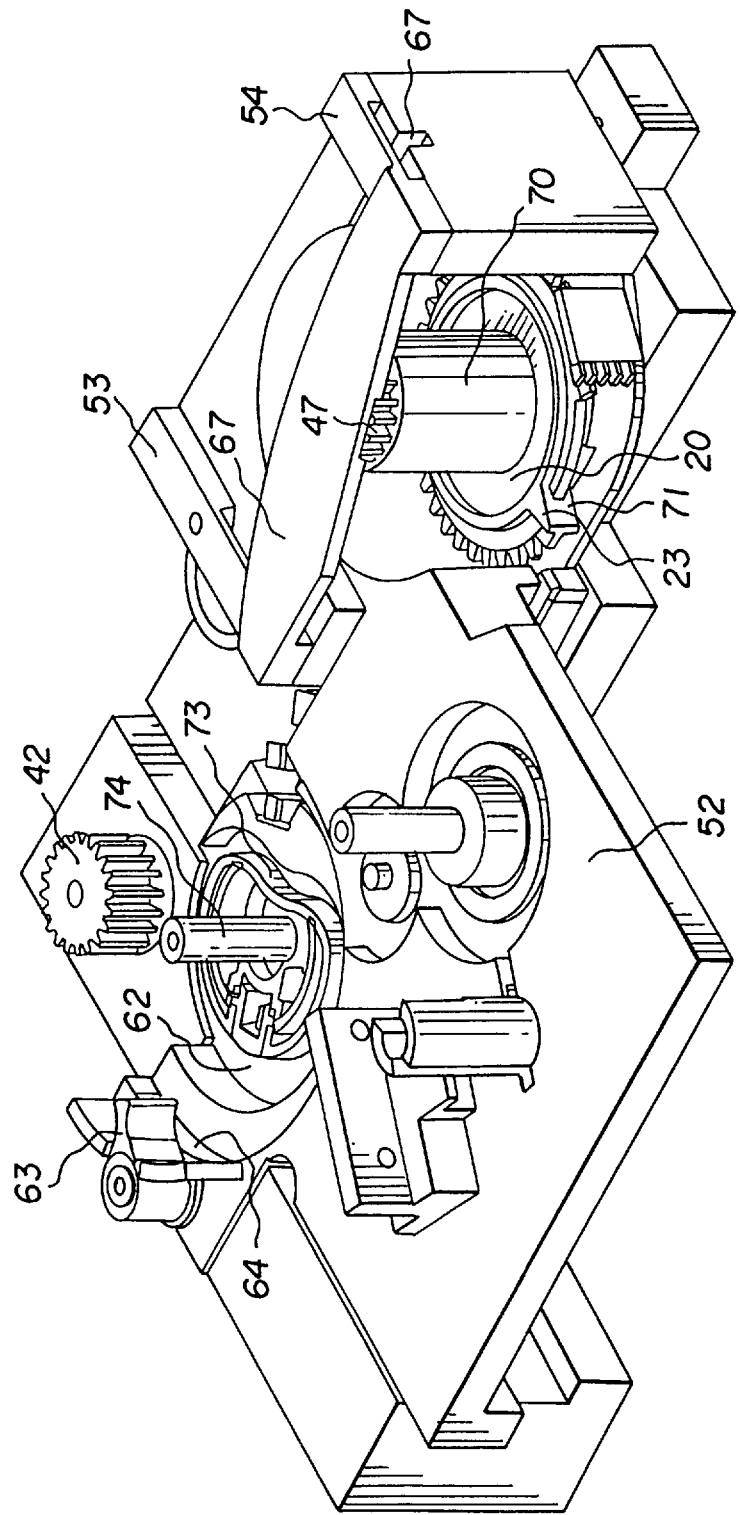
FIG. 6 is a perspective of the apparatus of FIG. 4, further components having been omitted for the sake of clarity.

The embodiment with the rigid crank lever is depicted in FIGS. 4, 5 and 6, in which components tallying with those of FIG. 2 are identified by the same reference numerals. The pick-off unit 30 (not shown) and the gearing 40 are arranged on a common mounting plate 52 (see FIG. 4). The mounting plate 52 is formed with recesses for the various mechanical components. As already known from FIG. 2, the driving gear 42 drives the intermediate gear 43. The circular motion of the intermediate gear 43 is transmitted by the rigid crank lever 45 to the concave rack 46 slidingly guidable in a limit stop formed by a first bracket 53 and a second bracket 54. The crank lever 45 is movably connected to the intermediate gear 43 through a first bearing 55 and to the rack 46 through a second bearing 56. A circular recess 57 for the pick-off gear 44 (not shown in FIGS. 4, 5 and 6) is provided in the mounting plate 52 and is adjacent to a circular recess 58 for the pick-off unit 30. Secured on the mounting plate, in close proximity to the circular recess 57 for the pick-off gear 44 and to the circular recess 58 for the pick-off unit 30, is a holder 59 for a sensor (not shown). Associated to the holder 59 is a bore 60 extending throughout the mounting plate 52. A sensing pin (not shown), by way of example, can be passed through the bore 60 and projects upwards from the mounting plate 52 when a disc holder containing a disk shaped object 4 is situated under the mounting plate 52.

For steady guidance and compensation in length of the rigid crank lever 45, there is mounted on the intermediate gear 43 a preloading device 61 on which the first bearing 55 of the crank 45 is mounted. The preloading device 61 serves for a sliding member to be urged against a control cam 62 (see FIG. 6) formed under the intermediate gear 43 in the mounting plate 52. Further, a stop 63 is provided, thus limiting the range of rotation of the intermediate gear 43. In the view of FIG. 4, the first bearing 55 bears against the stop 63. This is also to be regarded as the initial position or as the final position for the gearing 40, depending on which side of the stop 63 the bearing 55 is situated.

The perspective of FIG. 5 shows the spatial configuration of the mounting plate 52 and the spatial arrangement of the mechanical components of the gearing 40 (shown in FIG. 2). The intermediate gear 43 rotates in the mounting plate 52 in a recess 64 therein adjacent to the recess 57 for the pick-off gear 44 and recess 58 for the pick-off unit 30. The driving gear 42 lies exposed on the mounting plate 52 and engages with the intermediate gear 43 in that area which is not surrounded by the recess 64. The rotary motion of the intermediate gear 43 is transmitted to the concave rack 46 by the crank lever 45, here in rigid form. The rack 46 is conducted in a guide and the motion of the rack 46 is limited to a plane parallel to the plane of the mounting plate 52 by the first bracket 53 and second bracket 54. Further, the rack 46 has an L-shaped cross section, a first limb 65 of the L being parallel to the plane of the mounting plate 52 and a second limb 66 being arranged at right angles thereto. The rack 46 is formed with the toothed rim opposite the first limb 65. Lateral guidance of the rack 46 is attained by a slot 67 complementary to the second limb 66. Provided in the mounting plate 52 is a further cylindrical recess 68 spanned by a holder 69 formed with the first bracket 53 and second bracket 54. The holder 69 supports and bears the transmitting gear 47 rigidly connected to the feed gear 20 via a shaft 70. The projection 23 of the feed gear 20 has a radially projecting face 71 which is substantially right-angled and is of a height rising distinctly over the toothed rim of the feed gear 20.

The crank lever 45 is mounted with its first bearing 55 on a cylindrical member 72 of the preloading device 61. The cylindrical member 72 co-operates with the stop 63 (See FIG. 4) constituting a rotary limit for the intermediate gear 43. In FIG. 6, further components have been omitted to gain a view of the control cam 62 with which the mounting plate 52 is formed under the intermediate gear 43. The control cam 62 is substantially heart-shaped with a depression 73 opposite the stop 63. In the centre of the recess 64 for the intermediate gear 43 is an arbor 74 for the intermediate gear 43.

Further FIG. 6 clearly shows the shape of the slot 67 in which the second limb 66 (See FIG. 5) of the rack 46 is guided. The slot 67 is milled in the mounting plate 52 so as to be complementary to the concave shape or configuration of the rack 46 and to impart lateral guidance to the rack 46 and ensure that it always remains in engagement with the transmitting gear 47.

The plate-shaped or disk shaped objects removable together with a disc holder 6 from a magazine 2 by the apparatus embodying the invention are preferably compact discs (CDs) on which information (data) is already written or is yet to be written.

The invention has been described with respect to preferred embodiments. It will be understood, however, that parts of the apparatus may be modified within the capability of those skilled in the art, without departing from the scope of protection of the following claims.

| PARTS LIST | |
|---|---|
| 2 | Magazine |
| 4 | Plate-shaped/disk shaped object |
| 6 | Plate/Disc holder |
| 8a | Guide rail |
| 8b | Guide rail |
| 9 | Locking mechanism |
| 10 | Rack |
| 10a | Protrusion |
| 10b | Tooth-free zone |
| 10c | Equally spaced teeth |
| 10d | Extension |
| 10e | Front face |

-continued

PARTS LIST

| | |
|---|---|
| 11 | Flat area |
| 12 | Circular opening |
| 13 | Side rests |
| 14 | Recess |
| 15 | Lateral guides |
| 20 | Feed gear |
| 20a | Inner ring |
| 21 | Tooth-free protrusion |
| 22 | Uniformly toothed rim |
| 23 | Projection |
| 23a | Supporting element |
| 24 | Tooth-free zone |
| 30 | Pick-off unit |
| 32 | Slide bar |
| 34 | Sensor |
| 40 | Gearing |
| 41 | Shaft |
| 42 | Driving gear |
| 43 | Intermediate gear |
| 44 | Pick-off gear |
| 45 | Crank lever |
| 45a | First portion of crank lever |
| 45b | Second portion of crank lever |
| 46 | Rack |
| 47 | Transmitting gear |
| 48 | Link |
| 52 | Mounting plate |
| 53 | First bracket |
| 54 | Second bracket |
| 55 | First bearing |
| 56 | Second bearing |
| 57 | Circular recess for pick-off gear |
| 58 | Circular recess for pick-off unit |
| 59 | Holder for sensor |
| 60 | Bore |
| 61 | Preloading device |
| 62 | Control cam |
| 63 | stop |
| 64 | Recess |
| 65 | First limb |
| 66 | Second limb |
| 67 | Slot |
| 68 | Cylindrical recess |
| 69 | Holder |
| 70 | Shaft |
| 71 | Radially projecting face |
| 72 | Cylindrical member |
| 73 | Depression |
| 74 | Arbor |
| L | Length of plate/disc holder |
| B | Width of plate/disc holder |

What is claimed is:

1. Apparatus for removing and returning a plate holder adapted to receive a plate-shaped object, from and to an exchangeable magazine having at least one plate holder, comprising:

(a) a rack provided on one side of at least one plate holder; and (b) a feed gear engageable with the rack and actuable means for driving in two directions of rotation alternately, and wherein the feed gear has a tooth-free, raised zone arranged thereon in such a way as to engage with a corresponding tooth-free zone on the rack of the plate holder at the beginning of the withdrawing movement of the plate holder, the feed gear being peripherally provided with a projection which is offset towards the raised zone and pushes the plate holder at the end of its returning movement into the magazine to such an extent that the plate holder assumes a defined final position in the magazine, and that the feed gear and the rack of the plate holder are in a disengaged condition.

2. Apparatus as claimed in claim 1, characterized in that the feed gear has four different zones:

i) a raised, tooth-free zone;

ii) a zone having an uniformly toothed rim adjoining the raised, tooth-free zone;

iii) a zone having the projection adjoining the uniformly toothed rim; and iv) a tooth-free zone extending between the projection and the raised, tooth-free zone.

3. Apparatus as claimed in claim 2, characterized in that the projection of the feed gear has a right-angled, radially projecting face corresponding in its length to a height of the teeth of the uniformly toothed rim and equal in its width to a height of an inner ring of the feed gear.

4. Apparatus as claimed in claim 3, characterized in that formed on the projection is a supporting element which is longer than a tooth of the uniformly toothed rim and is formed perpendicular to the radially projecting face.

5. Apparatus as claimed in claim 1, characterized in that the rack of the plate holder has an extension extending beyond a front edge of the plate holder, the rack having on the extension a raised zone, adjacent to a tooth-free zone, followed by equally spaced teeth extending almost throughout the length of the plate holder.

6. Apparatus as claimed in claim 5, characterized in that the extension has a flat front face entering into co-operation with a radially projecting face of the projection of the feed gear when the plate holder is returned to the exchangeable magazine.

7. Apparatus as claimed in claim 1, further including a holder, a shaft and a transmitting gear connected to the shaft, the transmitting gear having a toothed rim, the feed gear being rigidly connected via the shaft to the transmitting gear, and supported in the holder, and that the toothed rim of the transmitting gear is in engagement with the means for driving, the rack having a concave configuration.

8. Apparatus as claimed in claim 7, characterized in that the concave rack is driven by a motor-driven driving gear which is in engagement with an intermediate gear and the crank lever, wherein the intermediate gear is connected to the concave rack by way of the crank lever, and in that the means for driving the feed gear includes a mounting plate movable along a bar and perpendicular to the plane of the plate holder.

9. Apparatus as claimed in claim 8, characterized in that the crank lever includes a first portion and a second portion interconnected through a link.

10. Apparatus as claimed in claim 8, characterized in that the crank lever is a rigid crank lever.

11. Apparatus as claimed in claim 10, characterized in that mounted on the intermediate gear is a preloading device urging a sliding member connected to the crank lever against a control cam formed under the intermediate gear in the mounting plate.

12. Apparatus as claimed in claim 11, characterized in that a stop is provided on the mounting plate , the preloading device having a cylindrical member which is connected to a first bearing of the crank lever and is movable against said stop, through which a rotary motion of the intermediate gear is limitable.

13. Apparatus as claimed in claim 11, characterized in that the control cam is heart-shaped.

* * * * *